(12) United States Patent
Zubieta Andueza et al.

(10) Patent No.: US 12,030,588 B2
(45) Date of Patent: Jul. 9, 2024

(54) ELECTRIC VEHICLES PROVIDED WITH CONTROL SYSTEMS BASED ON STIMULI TO THE USER

(71) Applicant: ZUMA INNOVATION S.L., Galdakao (ES)

(72) Inventors: Mikel Zubieta Andueza, Galdakao (ES); Jon Madariaga Landajo, Galdakao (ES)

(73) Assignee: ZUMA INNOVATION S.L., Galdakao (ES)

( * ) Notice: Subject to any disclaimer, the term of this patent is extended or adjusted under 35 U.S.C. 154(b) by 239 days.

(21) Appl. No.: 17/417,636

(22) PCT Filed: Dec. 23, 2019

(86) PCT No.: PCT/EP2019/086933
§ 371 (c)(1),
(2) Date: Jun. 23, 2021

(87) PCT Pub. No.: WO2020/136171
PCT Pub. Date: Jul. 2, 2020

(65) Prior Publication Data
US 2022/0119073 A1    Apr. 21, 2022

(30) Foreign Application Priority Data

Dec. 26, 2018  (EP) ..................... 18382994

(51) Int. Cl.
 *B62M 6/45*  (2010.01)
 *B60L 15/20*  (2006.01)
 *B60L 50/20*  (2019.01)

(52) U.S. Cl.
CPC ........... *B62M 6/45* (2013.01); *B60L 15/2045* (2013.01); *B60L 50/20* (2019.02); *B60L 2200/12* (2013.01);
(Continued)

(58) Field of Classification Search
CPC ....... B62M 6/45; B60L 15/2045; B60L 50/20; B60L 2200/12; B60L 2240/12;
(Continued)

(56) References Cited

U.S. PATENT DOCUMENTS 3,630,304 A   12/1971  Sahinkaya
6,122,588 A    9/2000  Shehan et al.
(Continued)

FOREIGN PATENT DOCUMENTS

DE    102011083072 A1    3/2013
EP       2783969 A1   10/2014
(Continued)

OTHER PUBLICATIONS

Interntional Search Report dated Mar. 3, 2020 re: Application No. PCT/EP2019/086933, pp. 1-4, citing: WO 117/129275 A1, WO 2015/128818 A1, EP 2 783 969 A1 and DE 10 2011 083072 A1.
(Continued)

*Primary Examiner* — James M McPherson
*Assistant Examiner* — Kyle J Kingsland
(74) *Attorney, Agent, or Firm* — CANTOR COLBURN LLP

(57) ABSTRACT

A vehicle includes a stimulus generator whose inputs are at least the mechanical torque (Tm) of the electric motor (M) measured by an estimator (TmE) of the mechanical torque (Tm) of the motor (M), and the velocity (V) measured by an estimator (VE) of the velocity (V) and whose outputs are a velocity control stimulus (VS) and a torque control stimulus (TS) towards the user (U). A vehicle includes a stimulus generator (SG) whose inputs are the power (Pu) measured by the estimator (PuE), and the velocity (V) measured by the estimator (VE) of the velocity (V) and whose output is a forced velocity control stimulus (VFS) that results in the
(Continued)

velocity setpoint (V*) of the electric motor (M). Control procedures for these vehicles are also described.

7 Claims, 11 Drawing Sheets

(52) U.S. Cl.
CPC ..... *B60L 2240/12* (2013.01); *B60L 2240/423* (2013.01); *B60L 2240/642* (2013.01); *B60L 2250/12* (2013.01)

(58) Field of Classification Search
CPC ......... B60L 2240/423; B60L 2240/642; B60L 2250/12; B60L 2240/14; B60L 2240/421; B60L 2260/42; Y02T 10/64; Y02T 10/72
See application file for complete search history.

(56) References Cited

U.S. PATENT DOCUMENTS

| | | |
|---|---|---|
| 6,364,434 B1 | 4/2002 | Sway-Tin et al. |
| 8,033,955 B2 | 10/2011 | Farnsworth |
| 2008/0300762 A1 | 12/2008 | Crombez |
| 2009/0227418 A1 | 9/2009 | Farnsworth |
| 2011/0251770 A1 | 10/2011 | Minarcin et al. |
| 2014/0081494 A1* | 3/2014 | Chun .................. B62J 6/12 701/22 |
| 2014/0333123 A1 | 11/2014 | Kunz et al. |
| 2019/0248439 A1* | 8/2019 | Wang .................. B62K 11/10 |
| 2019/0299797 A1* | 10/2019 | Hasumi ............... B60L 15/2045 |
| 2019/0308512 A1* | 10/2019 | Hasumi ............... B62M 6/45 |
| 2019/0315431 A1* | 10/2019 | Vijaya Kumar ......... B62M 6/45 |

FOREIGN PATENT DOCUMENTS

| | | |
|---|---|---|
| WO | 2015128818 A1 | 9/2015 |
| WO | 2017129275 A1 | 8/2017 |

OTHER PUBLICATIONS

Written Opinion dated Mar. 3, 2020 re: Application No. PCT/EP2019/086933, pp. 1-5, citing: WO 117/129275 A1, WO 2015/128818 A1, EP 2 783 969 A1 and DE 10 2011 083072 A1.

\* cited by examiner

ELECTRIC VEHICLES PROVIDED WITH CONTROL SYSTEMS BASED ON STIMULI TO THE USER

TECHNICAL FIELD

The present disclosure relates to control systems for vehicles equipped with an electric motor and its general objective is to provide a control system that engages the user in order to improve the driving experience or autonomy.

BACKGROUND

Electric vehicles move on the ground by overcoming its resisting force by the force provided by an electric motor and are also subjected to other forces, such as those generated by the mechanical brake used to control the velocity. As illustrated for example in FIG. 1, the balance of these forces determines the displacement (acceleration and velocity) of the vehicle. In this configuration the user feels the displacement of the vehicle and according to his wish for displacement defines the force (or torque) to be delivered by the motor, for example, by means of an accelerator, and the braking force to be applied, for example, by means of a mechanical brake. In this manner it is the user itself the one closing the control loop. The motor may further include an internal control loop for adjusting the motor torque to the torque demanded by the user.

FIG. 3 illustrates another example of the state of the art, in which the motor is controlled in velocity, so that a velocity estimator is needed, and a closed velocity control loop is operated. Additionally, the control of the whole system is still closed by the user, who, based on the perceived velocity sensation and his desire, will determine the velocity setpoint and the braking force.

As shown in FIG. 5, in the case of electric bicycles, the force exerted by the cyclist also contributes to the balance of forces and to determining the displacement and is usually considered for the control of the motor along with the vehicle dynamics (velocity and accelerations) and other sensors, such as inclinometers. In any case, it is always the cyclist the one closing the loop of the whole system according to the perceived velocity and his desire to move.

In the market there are multiple additional control systems (U.S. Pat. No. 3,630,304A, US20140333123A1, US20110251770A1, U.S. Pat. No. 6,122,588A, US20080300762A1, U.S. Pat. No. 6,364,434B1, US20090227418A1 or U.S. Pat. No. 8,033,955B2) for optimizing the control of the motor and other devices of the electric vehicle, but all the known ones have the premise of not interfering with the users displacement desire, or in other words, the user moves freely and the control systems are responsible for making the displacement as efficient as possible. However, without being able to influence the users actions, which closes the control loop of the entire system, it is difficult to significantly improve the driving experience or autonomy.

SUMMARY

To overcome the drawbacks of the state of the art, the present disclosure proposes a vehicle according to claim 1. Optional features are described in the dependent claims.

Therefore, the disclosure focuses on applying the pedaling model in the most direct way possible: measuring the power made by the cyclist and on that basis generating the forced stimulus of velocity control corresponding to that power according to the pedaling model considered. Applying the stimulus as forced command in the motor (there is no direct stimulus to the user) it is achieved that the cyclist cannot refuse the stimulus perceived as velocity variation if the appropriate power is not applied, this being the most effective way to increase the autonomy of the bicycle as previously described. Direct forced stimulation on the motor is possible on bicycles because in general it tends to reduce the assistance of the motor and make the vehicle to move at a lower and more safe velocity, and in any case the user can always apply the mechanical brake, if the state of the pavement or traffic does not make it advisable to go at the velocity set in the bicycle.

A significant autonomy improvement is achieved using only two sensors (vehicle velocity and user power), unlike the more advanced systems of the state of the art that in order to achieve autonomy extension (at a lower level than the proposed disclosure) and/or improving the driving experience in other senses fill the vehicle with lots of sensors. The approach in the state of the art is that the vehicle must know its environment in the best possible way to offer the best solution. However, according to this embodiment the control of the vehicle completely abstracts from knowing its surroundings and focuses exclusively on knowing the user, or, more specifically, knowing the power applied by him.

Later, knowing how the user wants the vehicle to behave—like in a windless flat good pavement—the velocity command that controls the vehicle is directly determined. In this way the particularities of the terrain—terrain slopes, wind, rugged high friction roads—are compensated by the control of the vehicle, and the aspects that the cyclist would also find in his ideal use—braking before curves, obstacles, . . . —will be resolved by the cyclist himself. This novel approach to the distribution of the control of the bicycle allows to realize a very efficient control in a very simple way with only two sensors, so that it diminishes the possibility of failures in the future, the initial cost is reduced and also the subsequent maintenance. These are some notable advantages when you want to extend this technology to the greatest number of users.

To explain the system operation from another perspective, one can consider that the dynamic model of the stimulus generator in this embodiment acts like an intelligent roller or virtual trainer as those used by professional or amateur cyclists. In these systems the cyclist pedals on a static bicycle, and the system captures the power exerted to simulate what would be the result of applying that power in a virtual terrain. In the case of the proposed embodiment the dynamic model of stimulus generator determines what would be the velocity at all times of the bike on a completely flat simulated environment, no wind and good pavement, and then this velocity is applied as the command to the motor so that it can make the cyclist move as if he were always in flat terrain.

With the control logic of the disclosure an immediate communication (or stimulation) between the cyclist and the control is achieved for a highly dynamic natural operation, understanding the cyclist that the bicycle will always behave as if it were in flat terrain, and if he wants to advance he will have to pedal with enough power. In this manner the system is forcing (stimulating) the cyclist to operate in a different situation to the real one (as if he was on flat terrain, even if he is going uphill or downhill) giving preference to the extension of the autonomy of the vehicle. As previously described, considering a model with a slope close to 0% is an appropriate solution, since very high autonomies are achieved while providing pleasant user sensations.

Users, in general, accept that non-assisted bicycles are pleasant enough to ride up to 3% slopes, above this figure they require motor assistance. Similarly, −3% slopes are pleasant to ride (terminal velocity of 20-30 km/h without pedaling), but for more pronounced slopes (lower value) continuously braking is required to control the velocity. Therefore, in this document it is understood that slopes in the range of −3% to 3% are slopes close to 0%, even if slope values closer to 0% will be preferred to feed the pedaling model.

In some embodiments, the stimulus generator comprises an additional acceleration input measured by the acceleration estimator.

In the embodiment explained above, the dynamic model itself acts as an acceleration estimator and is capable of determining the acceleration of the vehicle as a virtual trainer would in the virtual environment. But it is also possible to complement the system with a direct acceleration sensor or another additional acceleration estimator based on other measures to obtain greater accuracy.

In some embodiments the slope considered by the pedaling model is proportionally inverse to the state of charge of the battery and ranges from a maximum of 3% for a battery with 0% charge and a minimum of −1% fora battery with 100% load. The −1% to 3% range can still be considered close to 0% as described above.

The slope considered by the pedaling model can be proportionally inverse to the state of charge of the battery in a linear manner, or it can follow any other proportionally inverse pattern as long as the considered slope increases when the state of charge decreases.

Being the pedaling model the critical aspect when determining the autonomy of the bicycle and the sensations of the user, more complex models can be considered that vary the simulated slope as for example depending on the battery charge. For example, if it is felt that the battery is at low level, it would be possible to increase the slope considered in the pedaling model and generate an energy balance that favors the recharge of the battery, and in this way make the autonomy infinite or at least extend it significantly. On the other hand, if the battery is at high levels it will not be able to absorb great regenerations, so the slope considered in the pedaling model is reduced to avoid an energy balance that exceeds the capacity of the battery, and at the same time a more assisted and more pleasant operation for the user is achieved.

In some embodiments, the stimulus generator comprises additional inputs of forces of resistance measured by specific estimators such as an inclinometer, for the force corresponding to the slope and/or an anemometer for the force of wind resistance.

In this document it is understood as estimator of a parameter a sensor that is capable of directly measuring the value of the parameter, or the set of sensors, calculations and/or estimates that allow estimating the value of the parameter from other parameters or measurements.

In some embodiments, the slope considered by the pedaling model is proportional to the slope input measured by the specific estimator and ranges from a minimum of −3% and a maximum of 3%.

This range is still considered to be close to 0%, and it is pleasant for the user, as described above. In fact, due to cognitive dissonance effects, some users tend to have more pleasant riding experience when they feel a slightly uphill slope on the pedals when riding uphill and when they feel a gentle downhill slope on the pedals when riding downhill, instead of feeling 0% slope on the pedals when riding uphill and downhill. Some users have interiorized expectations when riding a bike that makes them feel that they are going slower downhill than uphill when the bike is configured to provide a 0% slope feeling on the pedals irrespective of the terrain slope, even if the actual velocity is the same for the same effort.

In order to address this particularity, the pedaling model can be set to greatly reduce the terrain slope effect but not to completely compensate it. In order to better address user expectations, different proportional patterns can be defined as long as the slope considered by the pedaling model increases when the slope input increases.

In some embodiments the specific slope estimator is based on the estimator of the mechanical torque of the motor and the pedaling model.

The pedaling model is configured to determine the moving velocity corresponding to the power applied by the user in a certain scenario. Then the pedaling model can estimate a new scenario (different slope) so that the power applied by the user plus the power applied by the motor results in the same moving velocity. As long as the pedaling model is precise enough the slope estimation will be precise enough with this method.

In some embodiments the slope considered by the pedaling model is proportional to the mechanical torque measured by the estimator of the mechanical torque of the motor and ranges from a minimum of −3% and a maximum of 3%.

Addressing the cognitive dissonance problem does not necessarily require the estimation of the real slope. Considering some proportionality exists between the mechanical torque of the motor and the real slope, the mechanical torque can be directly used to control the slope considered by the pedaling model and achieve a more pleasant functioning. Different proportional patterns can be defined as long as the slope considered by the pedaling model increases when the mechanical torque measured by the estimator of the mechanical torque of the motor increases.

Herein also a vehicle is disclosed, the vehicle being provided with an electric motor, an estimator of the velocity of the vehicle, an estimator of the mechanical torque of the motor, a means for commanding the electric motor and at least one additional mean for applying torque by one user of the vehicle, comprising a stimuli generator whose inputs are at least the mechanical torque of the electric motor measured by the estimator of the mechanical torque of the motor, and the velocity measured by the velocity estimator and whose outputs are a stimulus for velocity control and a torque control stimulus directed to the user.

In a conventional electric vehicle, the control loop is closed by the user according to the perceived velocity. In the present disclosure, a stimulus generator is presented which induces the vehicle user to close the control loop in a different way according to the desired objective, which may be, for example, to increase the autonomy. In this case the stimulus generator can calculate based on current variables the optimum velocity and the optimal additional torque to maximize vehicle range and transmits them to the user by means of the corresponding stimuli. Then it is the user's decision whether to consider or not these stimuli, depending on the user's interest on increasing autonomy. But at least it has a clear indicator of how to improve the user experience or autonomy, so it is expected that the user experience or autonomy will improve as compared to control systems without any stimulus towards the user.

In some embodiments, the stimulus generator comprises a non-velocity dependent torque estimator whose inputs are at least the mechanical torque of the electric motor, and the velocity, being the estimator configured to estimate the non-velocity dependent torque according to a dynamic model of the velocity-dependent torque.

To maximize the autonomy of an electric vehicle one must work in two areas:
1. Minimize the mechanical energy necessary to travel a certain distance.
2. Work in high efficiency points: decrease the electrical consumption for mechanical delivery.

In both cases, the key aspect is the velocity of travel. On one side, motor velocities with maximum efficiency are considered, but above all the velocity's effect on the energy required for covering distance should be considered. The forces to overcome during the displacement can be differentiated into two types:
1. Velocity-dependent forces such as aerodynamics; the higher the velocity, the greater the energy needed to perform the same displacement.
2. Forces not dependent on velocity such as gravity; regardless of the velocity, the energy necessary to make the displacement will be the same.

The simplest dynamic model that could be considered would be that the velocity-related forces are only the aerodynamic ones and that these are considered proportional to the velocity's cube:

$$F_v = K \cdot V^3 \quad (1)$$

In this case the non-velocity-dependent torque is calculated as:

$$Tnv = Tm - (K \cdot V^3)/Km \quad (2)$$

Where Tm is the torque exerted by the motor, K the aerodynamic constant, V the velocity of the vehicle and Km the ratio of reduction between the rotation of the motor and the displacement of the vehicle.

For more precision, more complex models of air resistance can be used and consider other velocity-dependent forces such as transmission forces. It would also be feasible to define the dynamic model of the velocity-dependent torque by means of a data table obtained experimentally or empirically adjusted for the best functioning of the system.

In some embodiments, the non-velocity-dependent torque estimator comprises an additional acceleration input as measured by the acceleration estimator, and the dynamic model of the velocity-dependent torque also considers acceleration.

For more precision, dynamic models can consider acceleration a that is experiencing the vehicle of mass m. The simplest model in this case would be:

$$Tnv = Tm - (K \cdot V^3 - m \cdot a)/Km \quad (3)$$

For even more precision, more complex models or tables can be used. It would also be feasible to define the dynamic model $Tv=f(v,a)$ by means of a data table obtained experimentally or empirically adjusted for the best functioning of the system.

In some embodiments, the means for commanding the electric motor is a torque set-point, the means for additional torque application is a brake, and the user receives a direct velocity control stimulus and a direct torque control stimulus.

This would be the case of applying the disclosure for example to an electric motorcycle in which the user receives a direct stimulus of velocity control to vary the velocity according to the motor accelerator and a direct stimulus of torque control to hit the brake and add an external resistance torque so that the motor can work in better conditions.

In any case, it would be the users decision to closely follow these stimuli or not according to his desire to pursue the objective of the stimulus generator, such as increasing autonomy. It is also up to the user to decide whether the stimulus is applicable or not in the conditions of use.

For example, in varied road or traffic situations (curves, signs in poor condition, pedestrian crossings, retentions, etc.) it will be unsafe or unfeasible to drive at the velocity indicated by the stimulus generator. This is an important reason why decisions to increase autonomy are not directly applied to the motor, but they are rather transmitted in stimuli form to the users "control loop".

In some embodiments, the means for commanding the electric motor is a velocity command, the means for additional torque application is a brake, and the user receives a direct velocity control stimulus and a direct torque control stimulus.

This would be the case of applying the disclosure to an electric car with a cruise control function in which the user receives a direct velocity control stimulus to vary the cruising velocity of the motor and a direct stimulus of torque control to hit the brake (the brake actuation would not disconnect the cruising velocity in the indicated application) and add an external resistance torque so that the motor can work in better conditions.

In any case, it would be the users decision to closely follow these stimuli or not according to his desire to pursue the objective of the stimulus generator or the feasibility of following them (road conditions and traffic).

In some embodiments the vehicle is provided with pedals for power input by a user and an estimator of the power generated by the user, and the means for commanding the electric motor is the users torque, the means for applying additional torque are a brake and the users torque, being the power of the user an additional input to the stimulus generator, and the user receives a direct stimulus of velocity control and a direct stimulus of torque control.

This would be the case of applying the disclosure for example to an electric bicycle in which the user receives a direct velocity control stimulus to vary the pedaling cadence (variation of user power if torque is kept) and a direct control stimulus of torque to vary the exerted torque (variation of user power if torque is kept) and make the motor work in better conditions. In case stopping all pedaling (zero user power) is not enough to meet the direct stimulus to reduce torque, the user will be able to understand the stimulus as that of hitting the brake to add more torque resistance to the motor.

In any case, it would be the users decision to closely follow or not these stimuli according to his desire to pursue the objective of the stimulus generator or the feasibility of following them (road conditions and traffic).

In some embodiments the vehicle is provided with pedals for power input by a user and an estimator of the power generated by the user, the means for applying additional torque are a brake and the users torque, being the power of the user an additional input to the stimulus generator, and the user receives a direct stimulus of velocity control and a forced torque stimulus corresponding to the torque command, which is the means for commanding the electric motor.

This would be the case of applying the disclosure to an electric bicycle in a similar way to the previous case only that the stimulus generator does not emit a direct torque control stimulus to the user, but it issues a forced torque stimulus to the motor. The effect generated by this command on the motor is perceived by the user as a stimulus in the form of variation of the perceived velocity. For example, instead of sending a direct stimulus to the user to increase the torque pedaling which the cyclist can obey or not depending on his interest, the stimulus generator sends a signal to reduce the mechanical torque to the motor, so that the vehicle will start to slow down. The cyclist will perceive this change and act accordingly (will be encouraged) to increase the required torque pedaling and keep the velocity he wants to keep. Thus, the main difference of this embodiment is that the rider is forced to follow the stimulus generated by the stimulus generator, so that a further improvement of the user experience or autonomy is achieved. The direct forced stimulation on the motor is possible in this case unlike previous cases because it is still the user who controls vehicle velocity according to the pedaling cadence applied. In addition, the forced stimulus to increase the autonomy will generally result in reducing the assistance of the motor and in making the vehicle move at a lower velocity and more safely. And in the less usual cases in which the forced stimulus entails an increase in velocity, the user can always avoid it, using the mechanical brake, if it is not convenient due to the state of the road or traffic.

It can be of great interest to apply this type of control for example in shared electric bicycles where the interest of increasing the autonomy of each bicycle of the operator goes against the users interest to move with maximum comfort and level of assistance. With this type of logics, the operator can force all users of their service to exercise a reasonable pedaling torque at all times and thus increase the autonomy of their bicycles.

This technology can also be applied as a velocity limitation system (high velocities could only be achieved if the cyclist exerts very high torques) and increase the safety of the bicycle in urban use for both the user and the rest of the road users.

In some embodiments, the stimulus generator operates according to the following procedure:
 a) Define an electrical torque map of the motor according to the axes of mechanical motor torque and motor velocity, based on the map of motor efficiencies;
 b) Define the current operating line, adding the curve of the velocity-dependent torque determined with the dynamic model, to the non-velocity-dependent torque determined by the estimator;
 c) Select the optimum point of lowest electrical torque in the map above the operating line;
 d) Determine from the map the velocity of the optimum point, the torque of the optimum point and the torque corresponding to the velocity of the optimum point in the operating line.
 e) Define a velocity control stimulus corresponding to the velocity of the optimum point multiplied by the motor ratio and to which the vehicle velocity is subtracted;
 f) Define a torque control stimulus corresponding to the torque difference of the optimum point with the torque corresponding to the velocity of the optimum point in the operating line.

This procedure has the objective of looking for the optimum point of operation of the motor to increase the autonomy. To perform the maximum distance with a certain energy it is necessary to minimize at all times the gradient of energy with respect to distance, or in other words to always work with the minimum electrical force, or electric torque if the force is brought to the motor according to the ratio of the motor.

As a general rule, the electric torque of the motor is lower if the mechanical torque is lower and the velocity of the motor is lower, which would make the system work in most cases at the minimum velocity of the defined operating line. However, motor efficiencies affect this general trend. For example, the maximum autonomy will never be obtained at zero or very low velocities, because the efficiency of the motor in this region is very low; at these velocities it is possible to maximize the time in operation of the motor because the power consumed is minimal, but the displacement of all this time will be reduced by the low velocity. In this way, in every motor and in every condition or operating line, there will be an optimum velocity, not null, dependent on the electric torque map (or the efficiency map) that entails maximum autonomy.

In very particular cases it is possible that there are "islands" in the electrical torque map as illustrated in FIG. 12 so that when the operating line is below that island, it is of interest to apply an additional holding torque, to increase the required mechanical torque. In this case, as described by the electric torque map in FIG. 12, the increase in the mechanical torque supposes a reduction of the electric torque due to the existence of this "island".

In some embodiments, the stimulus generator operates according to the following procedure:
 a) Define an electrical torque map of the motor according to the axes of mechanical motor torque and motor velocity, based on the map of motor efficiencies;
 b) Define the current operating line, adding the curve of the velocity-dependent torque determined with the dynamic model, to the non-velocity-dependent torque determined by the estimator, and subtracting the maximum torque that can be exerted by the user determined with the pedaling model, and adding the user's torque determined from the estimator of user generated power;
 c) Select the optimum point of lowest electrical torque in the map above the operating line;
 d) Determine from the map the velocity of the optimum point, the torque of the optimum point and the torque corresponding to the velocity of the optimum point in the operating line.
 e) Define a velocity control stimulus corresponding to the velocity of the optimum point multiplied by the motor ratio and to which the vehicle velocity is subtracted;
 f) Define a torque control stimulus corresponding to the torque difference of the optimum point with the torque corresponding to the velocity of the optimum point in the operating line, which is subtracted from the maximum torque that can be exerted by the user corresponding to the velocity of the optimal point, and the user's torque determined from the estimator of user generated power is subtracted.

In the case of an electric bicycle in which the user can apply a torque of additional propulsion it seems quite clear that the greater autonomy will be obtained when the power delivered by the cyclist is maximized. Even so, in a similar way as explained above and due to particularities in the map of efficiencies, it is possible (but not very likely) that "islands" appear in the electric torque map, with which in certain operating conditions it is possible to increase the autonomy if the cyclist reduces the applied power, the claimed mode of operation being able to detect these conditions and stimulate the user accordingly.

Even so, the key to increasing the autonomy of an electric bicycle in most cases is to maximize the power exercised by the user at all times in order to minimize motor assistance. But on the other hand, if the demands on the user are too high, his displacement will not be pleasant, which will result in a greater problem than a reduced autonomy. In this way, the main key to maximize bicycle autonomy is to determine an appropriate pedaling model and not so much to work with efficiency maps and electric torque maps that offer a marginal improvement only when the rest of the variables have been optimized to their fullest.

In some embodiments the velocity dependent torque pedaling model corresponds to the torque to be made by the user at each velocity to travel on terrain with a slope close to 0%, without wind and with good pavement, without assistance.

Being the pedaling model the most important aspect to maximize the autonomy of a bicycle, the most reasonable pedaling model could be to ask the user the power equivalent to riding on flat terrain. With this operation the motor would not assist in flat terrains where most users do not see any need for assistance. In fact, non-electric bicycles are very suitable for movement on flat ground. The problem is when riding uphill. Therefore, the proposed operation only assists during uphill climbs and only in the proportion corresponding to the gravitational energy of the slope, to provide the sensation of moving on flat terrain. Similarly, during downhills, the proposed operation would regenerate in proportion to the gravitational energy of the slope to provide the same feeling of displacement in flat terrain. Being gravity a conservative energy, energy regenerated downhill would balance the energy consumed uphill, and ideally this operative would lead to an infinite autonomy. But in practice due to efficiency losses in the motor and the rest of the bicycle this energy balance is not met. In order to achieve an infinite autonomy, the pedaling model should be adjusted to a slope slightly higher than 0%. And if obtaining an infinite autonomy is not the objective, high autonomy can always be achieved by adjusting the pedaling model to a slope close to 0% and thus ensuring a pleasant riding feeling for the user.

BRIEF DESCRIPTION OF THE DRAWINGS

To complement the description and in order to help a better understanding of the characteristics of the disclosure, according to some examples of practical embodiment of the vehicle, a set of figures is included as an integral part of the description. The purpose of the figures is illustrative but not necessarily restrictive, and the following has been represented.

DETAILED DESCRIPTION OF THE DRAWINGS

As it can be seen in FIGS. 2, 4, 6 and 7, the present disclosure relates to a vehicle 1 provided with an electric motor M, an estimator VE of the velocity V of vehicle 1, an estimator TmE of the mechanical torque Tm of the motor M, a means for commanding Cm* the electric motor M and at least one additional means for torque application Ta by a user U of the vehicle 1. Where Fm is the motor force, Tm is the motor torque, and Km is the motor ratio, Fb is the braking force, Tb is the braking torque, and Kb is the braking ratio.

G refers to the ground and environment in which the vehicle is traveling, Fg is the resistance force.

Where s is the Laplace variable.

Specifically, the vehicle 1 comprises a stimulus generator SG whose inputs are at least the mechanical torque Tm of the electric motor M measured by the estimator TmE of the mechanical torque Tm of the motor M, and the velocity V measured by the estimator VE of the velocity V and whose outputs are a velocity control stimulus VS and torque control stimulus TS towards the user U.

Figure 1:
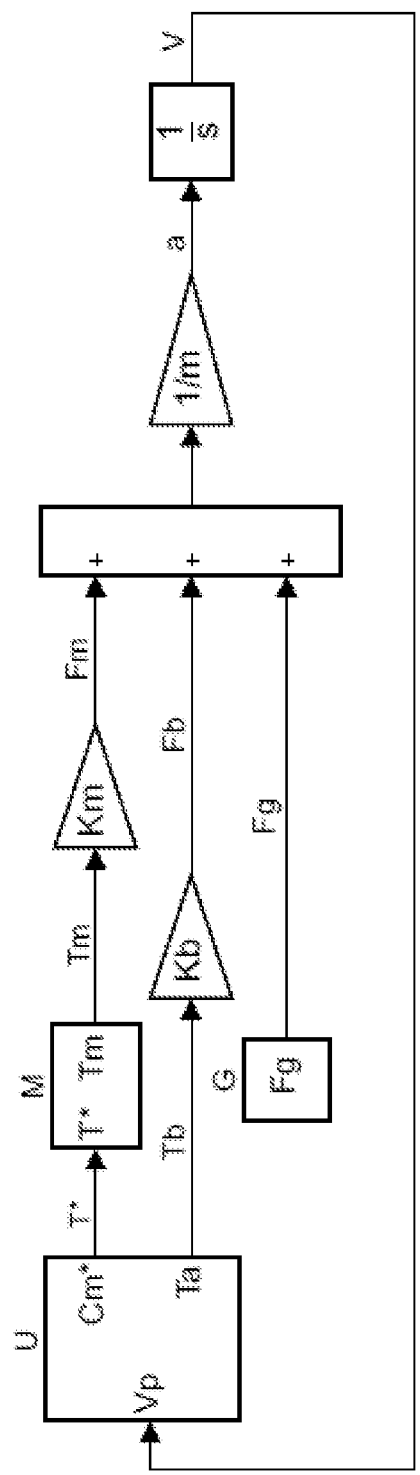
FIG. 1 is a known control diagram of a conventional electric vehicle.
Figure 2:
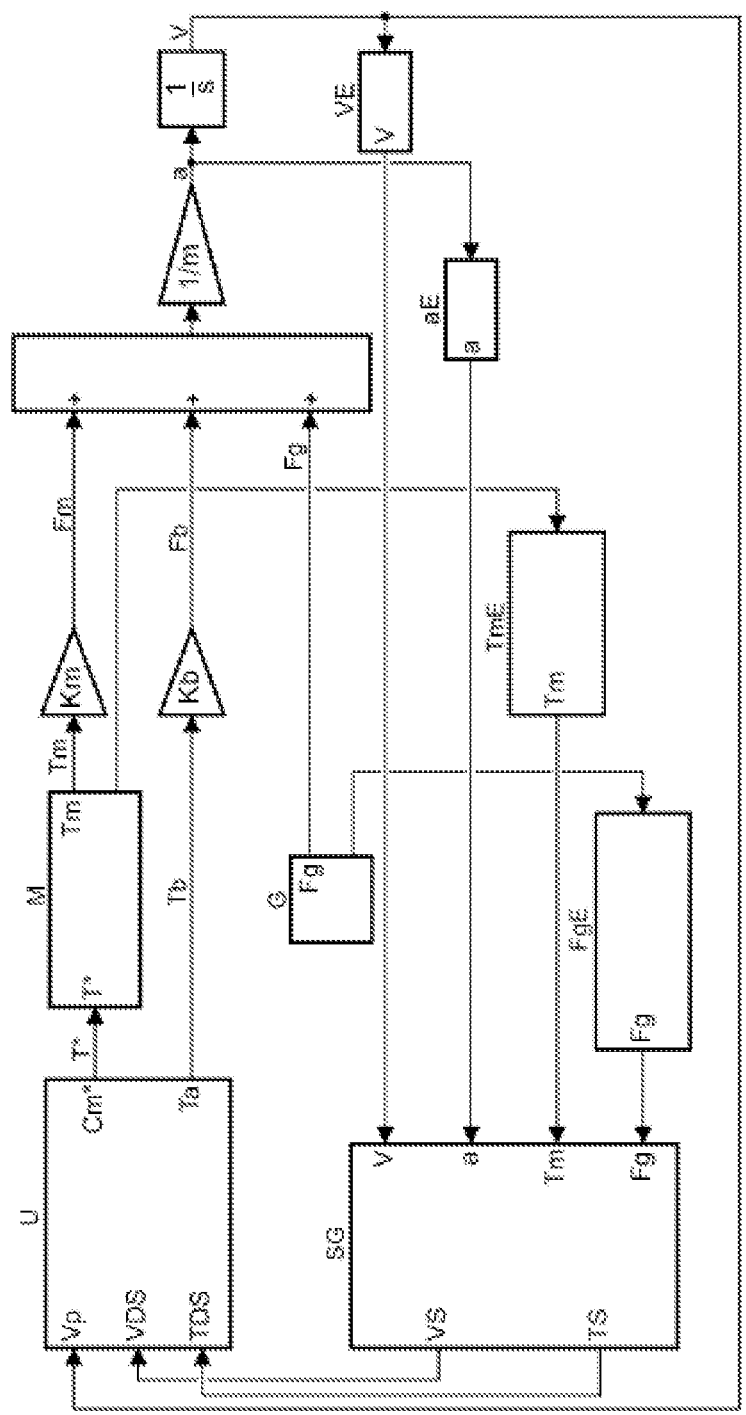
FIG. 2 is a control diagram with stimulus generator for extended autonomy according to a preferred embodiment of the disclosure.
Figure 3:
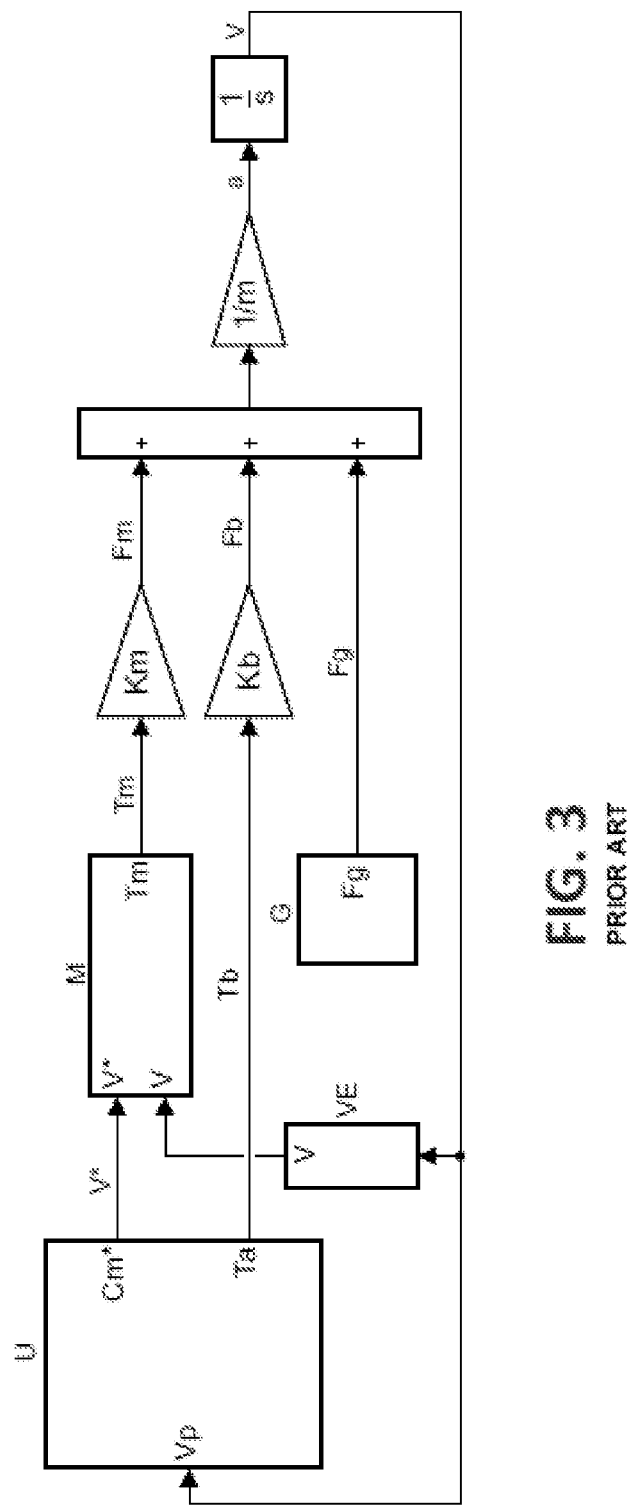
FIG. 3 is a known control diagram of an electric vehicle with cruise control.

As shown in FIG. 2, according to a preferred embodiment, the means for commanding Cm* the electric motor M is a torque setpoint T*, the additional means for torque application Ta is a brake Tb, and the user receives a direct velocity control stimulus VDS and a direct torque control stimulus TDS.

Figure 9:
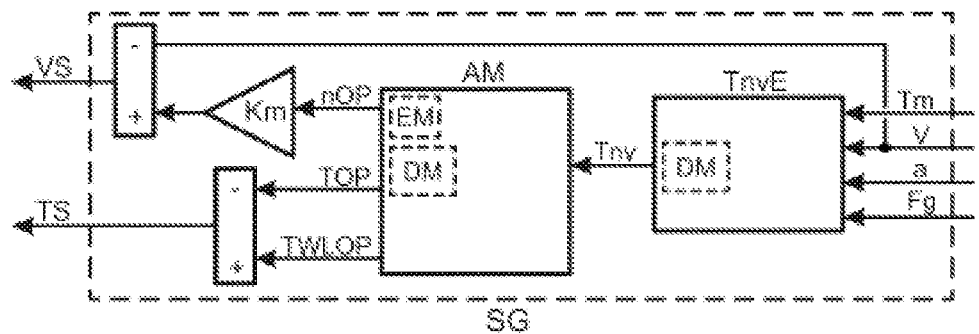
FIG. 9 is an internal control diagram of the stimulus generator for an electric vehicle according to a preferred embodiment of the disclosure.

In this embodiment, the stimulus generator corresponds to that of FIG. 9 and comprises an estimator TnvE of the non-velocity-dependent torque Tnv whose inputs are at least the mechanical torque Tm of the electric motor M, and the velocity V, being the estimator TnvE configured to estimate the non-velocity-dependent torque Tnv according to a dynamic model DM of the velocity-dependent torque Tv=f(v).

Subsequently, the non-velocity-dependent torque value Tnv is introduced to the electric torque Te map AM of the motor M from which the velocity control stimulus signal VS and the torque control stimulus signal TS are obtained using the dynamic model DM according to the following procedure illustrated in FIGS. 9 and 12:

a) Define a map AM of electric torque Te of the motor M according to the axes of mechanical torque Tm of the motor M and rotation velocity n of the motor M, from the efficiency map EM of the motor M obtained from the motor manufacturer.

b) Define the operating line WL of that moment, summing the curve of the velocity-dependent torque Tv, determined with the dynamic model DM, to the non-velocity-dependent torque Tnv, determined by the estimator TnvE.

$$WL = Tnv + Tv \qquad (4)$$

c) Select the optimal point OP of lower electrical torque Te of the map AM above the operating line WL
d) Determine from the map AM the velocity nOP of the optimum point OP, the torque TOP of the optimum point OP and the torque TWLOP corresponding to the velocity nOP of the optimum point OP in the operating line WL.
e) Define a velocity control stimulus VS corresponding to the velocity nOP of the optimal point OP multiplied by the motor ratio Km and to which the velocity V of vehicle 1 is subtracted.

$$VS = Km \cdot nOP - V \quad (5)$$

VS can be a positive or negative value, so that user U receives a direct velocity stimulus VDS to increase or decrease the torque setpoint T* and with it the vehicle velocity V until reaching the appropriate velocity when the stimulus VS is canceled.

f) Define a torque control stimulus TS corresponding to the torque difference of the optimal point TOP with the torque TWLOP corresponding to the velocity nOP of the optimum point OP in the operating line WL.

$$TS = TWLOP - TOP \quad$$

TS will be always a negative value in this embodiment, so that the user U receives a direct stimulus torque TDS to increase the braking torque Tb to cancel the stimulus TS.

Optionally, as shown in FIG. 9, the estimator TnvE of the non-velocity-dependent torque Tnv comprises an additional input of acceleration a as measured by the estimator aE of the acceleration a, and the dynamic model DM of the velocity-dependent torque considers also the acceleration Tv=f(v,a).

It can also be provided that the estimator TnvE of the non-velocity-dependent torque Tnv comprises additional input forces of resistance Fg measured by means of specific estimators FgE such as an inclinometer for the force corresponding to the slope and/or an anemometer for the resistance force of the wind.

Figure 4:
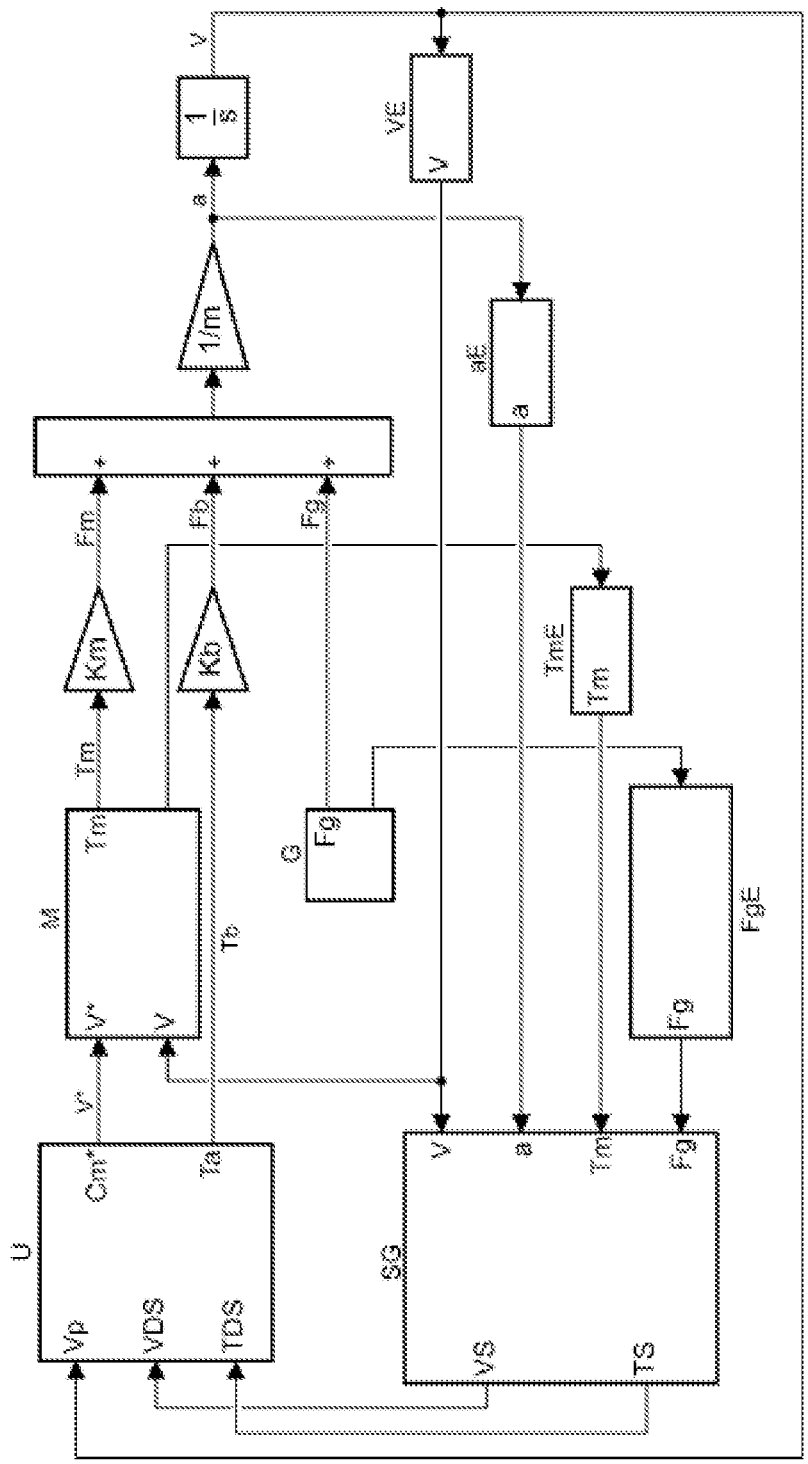
FIG. 4 is a control diagram with stimulus generator for extended autonomy according to another preferred embodiment of the disclosure.
Figure 5:
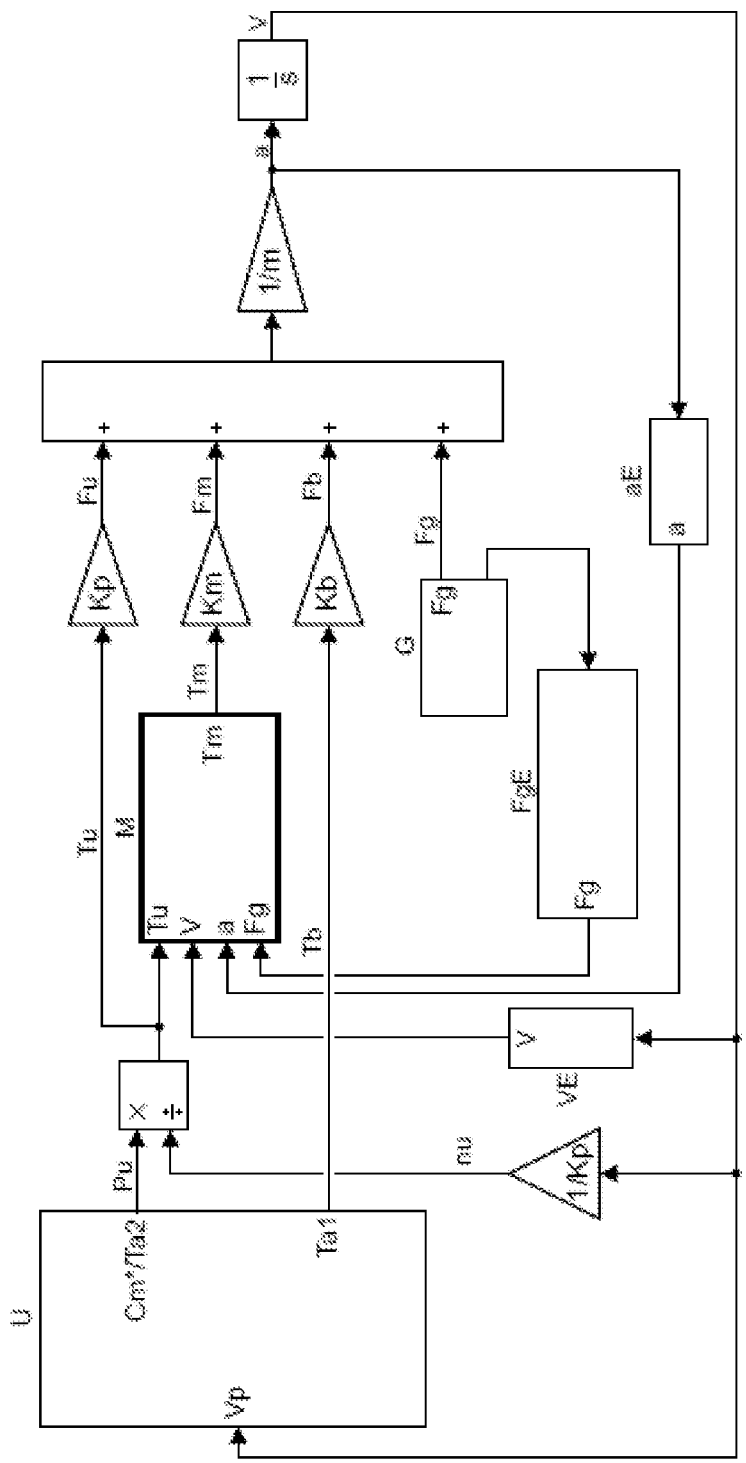
FIG. 5 is a control diagram of a conventional electric bicycle.

According to another embodiment illustrated in FIG. 4, the means for commanding Cm* the electric motor M is a velocity setpoint V*, the additional means for torque application Ta is a brake Tb, and the user receives a direct velocity control stimulus VDS and a direct torque control stimulus TDS.

Figure 12:
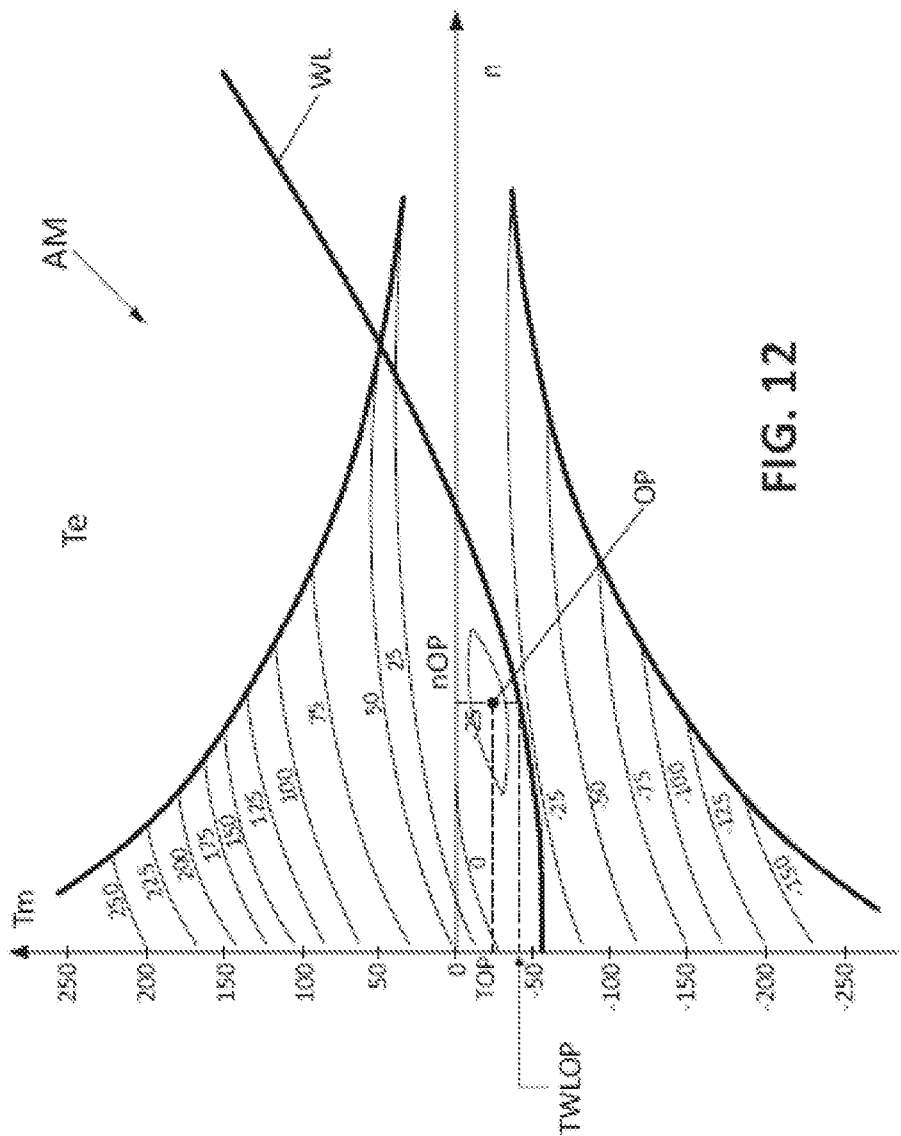
FIG. 12 is a map of the electrical torque as a function of the mechanical torque and the velocity of the motor.
Figure 13:
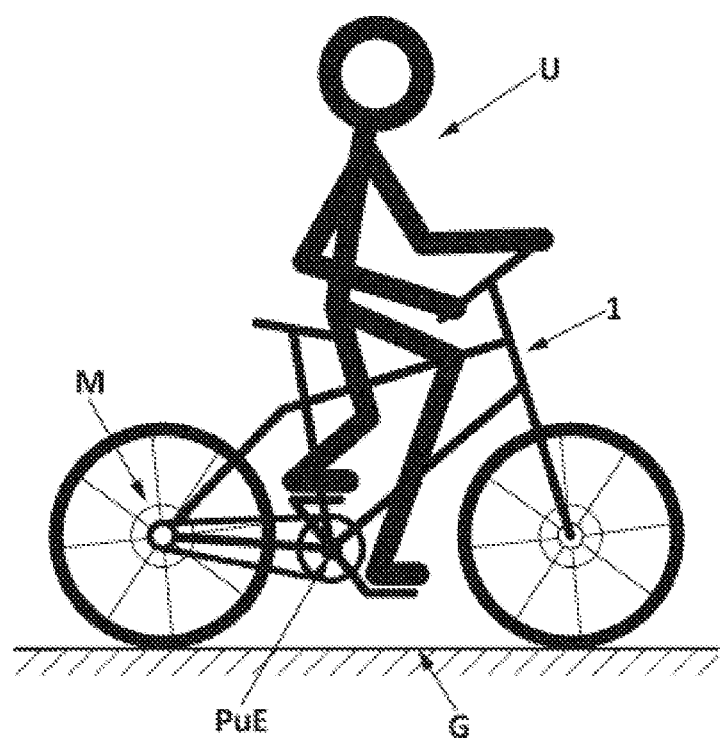
FIG. 13 is a simplified representation of a user riding an electric bicycle according to a preferred embodiment of the disclosure.

In this embodiment, the stimulus generator corresponds to that of FIG. 9 and works exactly as in the previous embodiment and follows also the same procedure for obtaining the stimuli VS and TS in the map AM from input Tnv according to FIG. 12. The stimuli VDS and TDS directly reach the user U who will act accordingly until the stimuli are canceled:
By increasing the braking torque Tb until TDS is canceled.
By varying the setpoint V* of motor M until VDS is canceled. And it will be the control of the motor M the one that will internally determine the necessary torque to reach such velocity V in the most appropriate form.

Figure 6:
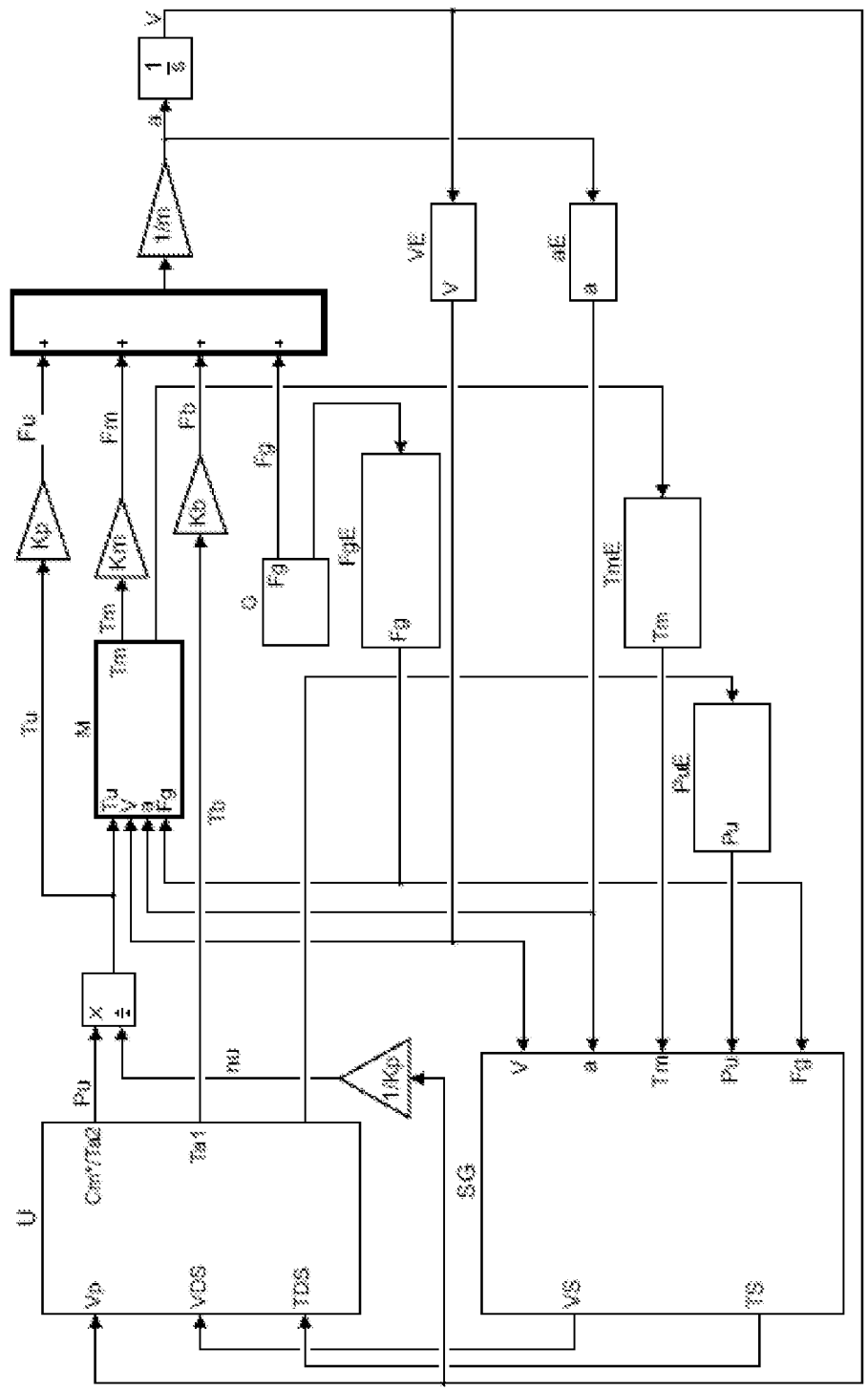
FIG. 6 is a control diagram with stimulus generator for extended autonomy according to another preferred embodiment of the disclosure.

According to another embodiment illustrated in FIG. 6, the vehicle is provided with pedals for power input Pu by a user U and an estimator PuE of the power Pu generated by the user U, in which the means for commanding Cm* the electric motor M is the users torque Tu, the additional means for torque application Ta is a brake Tb and the users torque Tu, being the power of the user Pu an additional input to the stimuli generator SG, and the user receives a direct velocity control stimulus VDS and a direct torque control stimulus TDS.

Where Fu is the user force, Tu is the user torque, and Kp is the user ratio.
Where Ta1 is the user braking torque exerted and Ta2 is the user propelling torque.

Figure 10:
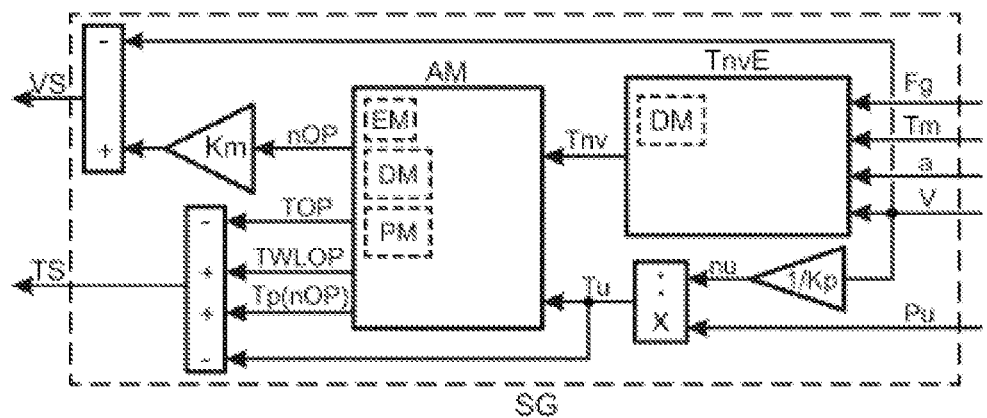
FIG. 10 is an internal control diagram of the stimulus generator for an electric bicycle according to another preferred embodiment of the disclosure.

In this embodiment, the stimulus generator SG corresponds to that of FIG. 10 and comprises a torque estimator TnvE of the non-velocity-dependent torque Tnv equivalent to that of FIG. 9 described above, and may similarly contain additional acceleration a inputs and/or inputs of resistance forces Fg. The process for producing the stimuli VS and TS in the map AM from input Tnv is similar to that illustrated in FIG. 12:

a) Define a map AM of electric torque Te of the motor M according to the axes of mechanical torque Tm of the motor M and rotation velocity n of the motor M, from the efficiency map EM of the motor M obtained from the motor manufacturer.

This step is the same as step a) of the method of the stimulus generator SG of FIG. 9 described above.

b) Define the operating line WL of that moment, adding the curve of the velocity-dependent torque Tv, determined with the dynamic model DM, to the non-velocity-dependent torque Tnv, determined by the estimator TnvE and subtract the curve of the maximum torque realizable by the user Tp, determined with the pedaling model PM, and adding the users torque Tu determined from estimator PuE of the power Pu generated by the user U.

$$WL = Tnv + Tv - Tp + Tu \quad (6)$$

In this embodiment when defining the WL operating curve, it is necessary to consider also the torque Tu performed by the user U, and the maximum torque Tp that the user U can perform. This will lead to a flatter WL curve than in the previous embodiments that will lead to operating at optimal OP points of lower Te value. This is, the pedaling of the cyclist implies a lower consumption of the battery and greater autonomy of the vehicle as it can be obviously deduced.

c) Select the optimal point OP of lower electrical torque Te of the map AM above the operating line WL This step is the same as step c) of the method of the stimulus generator SG of FIG. 9 described above.

d) Determine from the map AM the velocity nOP of the optimum point OP, the torque TOP of the optimum point OP and the torque TWLOP corresponding to the velocity nOP of the optimum point OP in the operating line WL.

This step is the same as step d) of the method of the stimulus generator SG of FIG. 9 described above.

e) Define a velocity control stimulus VS corresponding to the velocity nOP of the optimal point OP multiplied by the motor ratio Km and to which the velocity V of vehicle 1 is subtracted.

$$VS = Km \cdot nOP - V \quad (7)$$

This step is the same as step e) of the method of the stimulus generator SG of FIG. 9 described above only that the user will react differently to the stimulus. VS can be a positive or negative value, so that the user U receives a direct velocity stimulus VDS to increase or decrease his pedaling cadence nu and with it the velocity V of the vehicle until reaching the appropriate velocity when the stimulus VS is canceled.

f) Define a torque control stimulus TS corresponding to the difference between the torque of the optimum point TOP with the torque TWLOP corresponding to the velocity nOP of the optimum point OP in the operating line WL, which is subtracted from the maximum torque that can be made by the user Tp(nOP) corresponding to the velocity nOP of the optimal point OP and to which the torque made by the user Tu is subtracted, being the latter determined from the estimator PuE of the Pu power generated by the user U:

$$TS = Tp(nOP) - (TOP - TWLOP) - Tu \quad (8)$$

In this embodiment, when defining the torque control stimulus TS, it is also necessary to consider the torque Tu performed by the user U, and the maximum torque Tp(nOP) that the user U can perform at the velocity nOP of the optimal point OP. And in this way the torque control stimulus TS is correlated with the additional torque differential that user U has to perform on the torque Tu that user U is already performing.

TS can be a positive or negative value, so that user U receives a direct torque stimulus TDS to increase or decrease his pedaling torque Tu until canceling TS. In case TS is negative and it is not enough to stop pedaling, the user will apply a braking torque Tb until the stimulus TS is canceled.

In this manner the stimuli VDS and TDS show the cyclist how he has to pedal to obtain maximum autonomy. Then it is the user's decision to follow or not those indications according to his desire or ability to increase autonomy.

Preferably, the pedaling model PM of the velocity-dependent torque Tp=f(v) corresponds to the torque to be performed by the user U at each velocity to travel on terrain with a slope close to 0%, without wind and with good pavement, without assistance (Tm=0) of the motor M.

And very preferably the slope considered by the pedaling model (PM) is proportionally inverse to the state of charge of the battery and ranges from a maximum of 3% for a battery with 0 charge and a minimum of −1% for a battery with 100% load.

Figure 7:
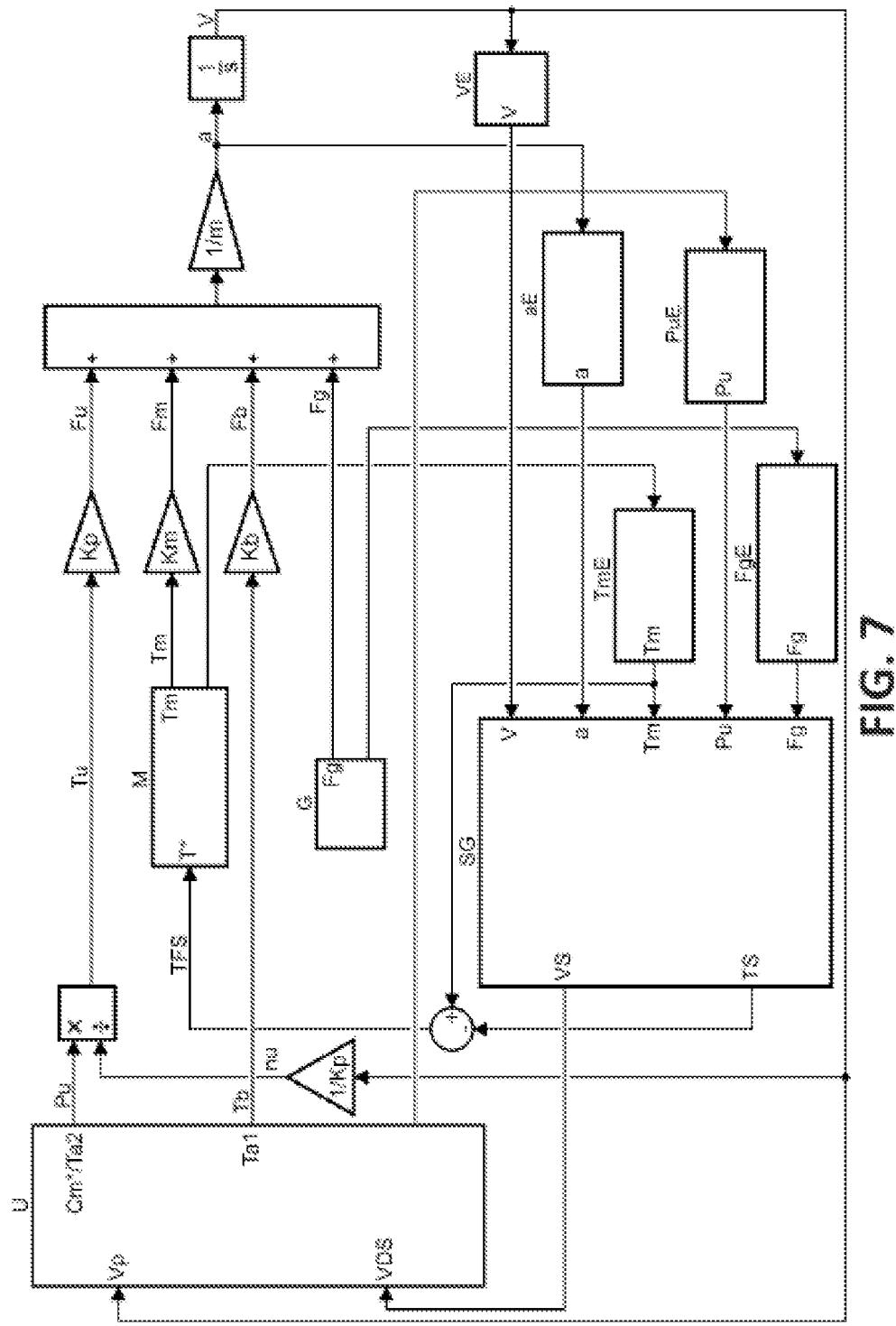
FIG. 7 is a control diagram with forced stimulus generator for extended autonomy according to another preferred embodiment of the disclosure.

According to another embodiment illustrated in FIG. 7, the vehicle is provided with pedals for the input of power Pu by a user U and an estimator PuE of the power Pu generated by the user U, the additional means for torque application Ta are a brake Tb and the torque of the user Tu, the power Pu being an additional input to the stimuli generator SG, and the user receives a direct velocity control stimulus VDS and a forced torque control stimulus TFS that corresponds with the torque command T* which is the means for commanding Cm* the electric motor M.

In this embodiment, the stimulus generator corresponds to that of FIG. 10 and works exactly as in the previous embodiment, and the procedure for obtaining the stimuli VS and TS in the map AM from inputs Tnv and Tu is also applied in the same way, according to FIG. 12.

The VDS stimulus arrives directly to the user U who acts consequently varying the pedaling cadence as indicated in the previous embodiment until the stimulus VDS is canceled. The difference between this embodiment (FIG. 7) and the previous one (FIG. 6) is that the torque control stimulus TS, corresponding to the variation of the torque Tu required by the user U, is not transmitted to the user U but it is subtracted from the torque Tm of the motor M, creating a forced torque stimulus TFS that is applied to the motor as a command T*.

This will imply a direct variation in the velocity V of the vehicle 1 that will be perceived by the user U (perceived velocity Vp) and act accordingly to maintain the velocity V that he wants. This is, the user U has been stimulated to perform a variation corresponding to the torque stimulus TS in the torque Tu that he applies. By forcing the user U to follow the stimulus, greater autonomy is imposed.

Figure 8:
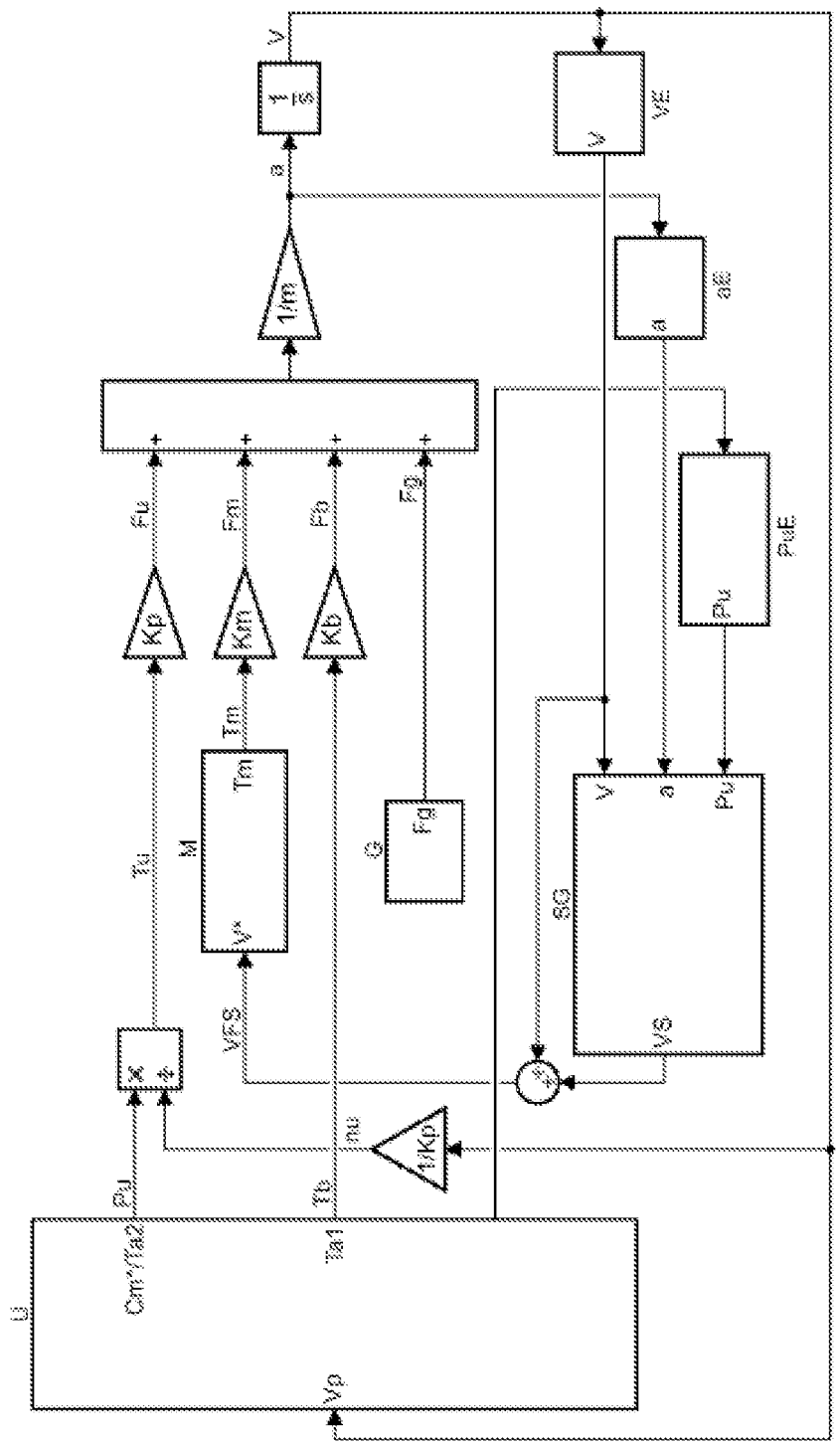
FIG. 8 is a control diagram with simplified forced stimulus generator for extended autonomy according to another preferred embodiment of the disclosure.

As shown in FIG. 8, the disclosure also relates to a vehicle 1 having an electric motor M, an estimator VE of the velocity V of vehicle 1, pedals for power input Pu by a user U, an estimator PuE of the power Pu generated by the user U, and a brake that applies an additional torque Ta in addition to the torque of the user Tu, but in this case the vehicle comprises a stimuli generator SG whose inputs are the power Pu, and the velocity V measured by the estimator VE of the velocity V and whose output is a forced velocity control stimulus VFS that results in the velocity command V* of the electric motor M.

Figure 11:
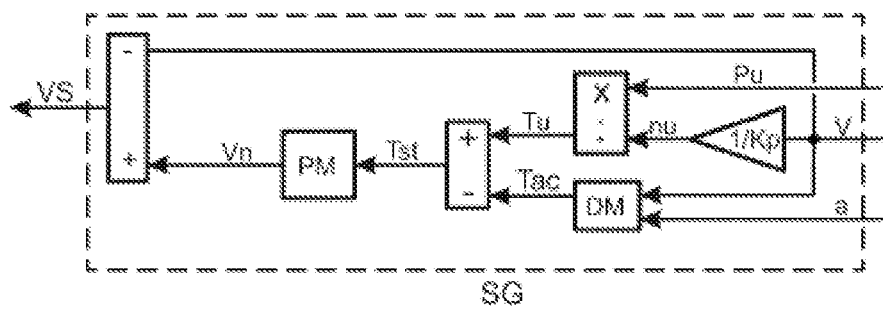
FIG. 11 is an internal control diagram of the simplified stimulus generator for an electric bicycle according to another preferred embodiment of the disclosure.

In this variant, the stimulus generator SG operates according to the following procedure defined in FIG. 11:
a) Define the stationary torque Tst of the user U, subtracting from the torque of the user Tu the torque Tac corresponding to the acceleration a according to the dynamic model DM; In this case the acceleration a is estimated by the dynamic model itself so that the stationary torque Tst of the user U is calculated considering only the torque of the user Tu, the vehicle velocity V and the dynamic model DM
b) Obtain the natural velocity Vn by means of the pedaling model PM corresponding to the torque to be performed by user U at each velocity Tst=f(v) to travel on terrain with a slope close to 0%, without wind and with good pavement, without assistance Tm=0 of the motor M;
c) Define a velocity control stimulus VS corresponding to the natural velocity Vn minus the velocity V of the vehicle 1.

In the above listing, f(v) refers to a function f of the velocity v.

In the present specification, as it is known by the skilled person, stationary torque refers to a torque exerted on the vehicle when it is in a state in which it is not experiencing velocity variations (without any acceleration), as opposed to being in a transient or velocity changing state (with acceleration). In other words, a stationary torque matches in magnitude and opposes other torques/forces acting on the vehicle so that it maintains its motion state (i.e. it allows the vehicle to keep moving at a constant velocity without suffering any acceleration or deceleration).

The stimulus velocity control VS corresponds to the variation of the velocity V of the vehicle 1 to be obtained. Adding this stimulus VS to the velocity V as shown in FIG. 8, we get the forced velocity control stimulus VFS that is introduced to the motor M as a command V*. In this way, the system is forced to have a velocity V of vehicle 1 corresponding to the power Pu exerted by user U. Although there is no direct stimulation to user U, this mode of operation assumes that user U has to adjust his power delivery Pu to those of the maximum autonomy to move at the desired velocity; this is, the user U is effectively stimulated (rather forced) to act in a certain way specific to extend the autonomy of the vehicle 1.

Preferably the slope considered by the pedaling model PM in this embodiment is proportionally inverse to the state of charge of the battery and ranges from a maximum of 3% for a battery with 0% charge and a minimum of −1% for a battery with 100% charge.

Also preferably the slope considered by the pedaling model PM in this embodiment is proportional to the mechanical torque Tm measured by the estimator TmE of the mechanical torque Tm of the motor M and ranges from a minimum of −3% and a maximum of 3%.

In order to overcome the cognitive dissonance that some users experience, the slope considered by the pedaling model PM will be higher when the bicycle is on an uphill terrain and the mechanical torque Tm of the motor M is higher (positive), and the slope considered by the pedaling model PM will be lower when the bicycle is on a downhill terrain and the mechanical torque Tm of the motor M is lower (negative). Proportionally lower assistance on uphills and lower regeneration on downhills will also result on increased autonomy (since no assistance on uphill and no regeneration on downhill leads to infinite autonomy).

Preferably, in order to improve dynamics and reduce costs, the same torque estimator TmE as the one used on the torque control loop of the motor or the current control loop of the motor will be used, for example an ammeter.

Optionally, the stimulus generator SG comprises additional inputs of resistance forces Fg measured by specific estimators FgE such as an inclinometer for the force corresponding to the slope and/or an anemometer for the force corresponding to the wind resistance. With direct measurement of the slope, the slope considered by the pedaling model PM is proportional to the slope input measured by the specific estimator FgE and ranges from a minimum of −3% and a maximum of 3%. This specific estimator FgE could enable more precis strategies for overcome the cognitive dissonance and to increase autonomy.

In another embodiment instead of using the inclinometer as specific slope estimator FgE, the specific estimator FgE is based on the estimator TmE of the mechanical torque Tm of the motor M and the pedaling model PM. If all the parameters of the pedaling model are precise as well as the inputs that feed the model are precise, the slope estimation will be precise. But, as pedaling model parameter cannot be exact for every situation and no sensor is totally precise, the slope estimation will not be as precise as with an inclinometer, although it could be sufficiently precise for the application, and it would be a cheaper alternative.

Optionally, the stimulus generator SG of this embodiment comprises an additional input of acceleration as measured by the estimator aE of the acceleration a as shown in FIG. 8, which will be an input to the dynamic model DM of the stimulus generator SG as it is shown in FIG. 11.

In this text, the word "comprises" and its variants (such as "understanding", etc.) should not be interpreted in an exclusive manner, that is, they do not exclude the possibility that what is described includes other elements, steps, etc.

On the other hand, the disclosure is not limited to the specific embodiments that have been described but also covers, for example, the variants that can be made by the average expert in the field (for example, regarding the choice of materials, dimensions, components, configuration, etc.), within what is clear from the claims.

The invention claimed is:

1. A vehicle comprising: an electric motor, an estimator of a velocity of the vehicle, an estimator of a mechanical torque of the motor, pedals for a contribution of power by a user, an estimator of the power generated by the user, and a brake that applies an additional torque in addition to a user torque, wherein the vehicle further comprises a stimulus generator having inputs including the user's power and the velocity measured by an estimator of the velocity and having an output that is a forced velocity control stimulus is used as a velocity command of the electric motor and wherein the stimulus generator operates according to the following procedure:

a) define a stationary torque of the user, that corresponds to a cruise torque that allows the vehicle to keep moving at a constant velocity without any acceleration or deceleration, subtracting from the user's torque the torque corresponding to the acceleration according to a dynamic model that relates the velocity of the vehicle, the mechanical torque of the motor, the power generated by the user, the additional torque and the acceleration, b) obtain a natural velocity by means of a pedaling model that corresponds to a torque to be performed by the user at each velocity to travel on terrain with a 0% slope, without wind and on a flat pavement, without assistance of the motor, and c) obtaining the velocity control stimulus corresponding to the natural velocity minus the velocity of the vehicle, and the vehicle is operated such that:

on flat terrain: the motor provides no assistance and the velocity achieved by the vehicle is the same as if the user was riding a non-motor-assisted vehicle on flat terrain;

on ascending terrain: the motor provides enough assistance to compensate for gravity, and the user exerts the same effort as when moving on flat terrain, and the velocity achieved by the vehicle is the same as if the user was riding a non-motor-assisted vehicle on flat terrain; and on descending terrain: the motor brakes the vehicle to compensate for gravity exerting an acceleration force on the vehicle, and the user exerts the same effort as when moving on flat terrain, and the velocity achieved by the vehicle is the same as if the user was riding a non-motor-assisted vehicle on flat terrain.

2. The vehicle according to claim 1, wherein the stimulus generator comprises an additional acceleration input measured by an estimator of the acceleration.

3. The vehicle according to claim 1, in wherein the slope considered by the pedaling model is proportionally inverse to the state of charge of the battery and ranges from a maximum of 3% slope for a battery with 0% charge and a minimum of −1% slope for a battery with 100% charge.

4. The vehicle according to claim 1, wherein the stimulus generator comprises additional inputs of resistance forces measured by specific estimators such as an inclinometer for the force corresponding to the slope and/or an anemometer for the force corresponding to the wind resistance.

5. The vehicle according to claim 4, in wherein the slope considered by the pedaling model is proportional to the slope input measured by a specific estimator and ranges from a minimum of −3% and a maximum of 3%.

6. The vehicle according to claim 5, wherein the specific slope estimator is based on the estimator of the mechanical torque of the motor and the pedaling model.

7. The vehicle according to claim 1, wherein the slope considered by the pedaling model is proportional to the mechanical torque measured by the estimator of the mechanical torque of the motor and ranges from a minimum of −3% and a maximum of 3%.

* * * * *